No. 874,419.     
PATENTED DEC. 24, 1907.

W. R. McKEEN, Jr.
CLUTCH MECHANISM.
APPLICATION FILED OCT. 2, 1905.

3 SHEETS—SHEET 1.

Witnesses
Chas. F. Clagett
C. H. Colson

Inventor
W. R. McKeen Jr.
By his Attorneys
Warfield + Duell

No. 874,419. PATENTED DEC. 24, 1907.
W. R. McKEEN, Jr.
CLUTCH MECHANISM.
APPLICATION FILED OCT. 2, 1905.

3 SHEETS—SHEET 2.

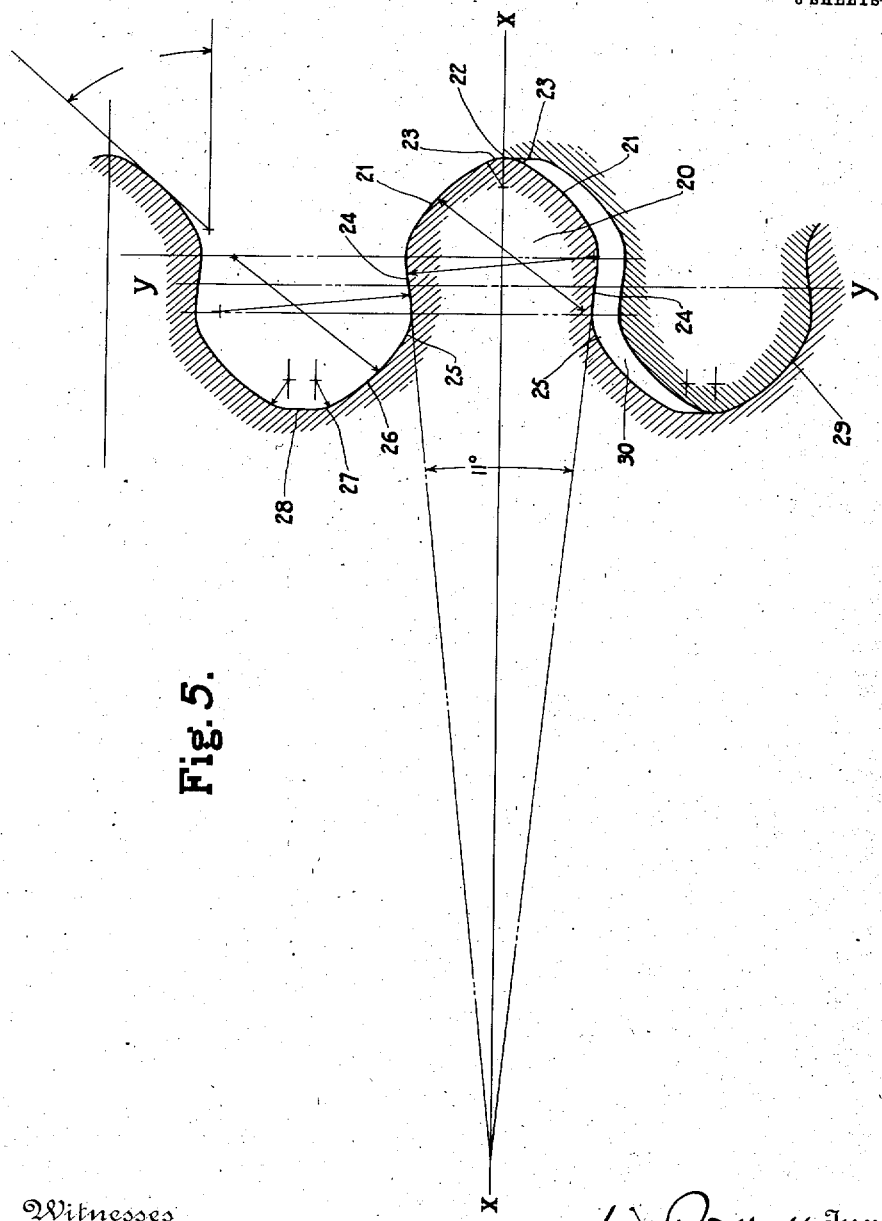

UNITED STATES PATENT OFFICE.

WILLIAM R. McKEEN, JR., OF OMAHA, NEBRASKA, ASSIGNOR TO EDWARD H. HARRIMAN, OF ARDEN, NEW YORK.

CLUTCH MECHANISM.

No. 874,419.        Specification of Letters Patent.        Patented Dec. 24, 1907.

Application filed October 2, 1905. Serial No. 280,922.

*To all whom it may concern:*

Be it known that I, WILLIAM R. McKEEN, Jr., residing at Omaha, in the county of Douglas and State of Nebraska, have invented certain new and useful Improvements in Clutch Mechanism, of which the following is a full, clear, and exact description, such as will enable others skilled in the art to which it appertains to make and use the same.

This invention relates to power-transmitting mechanism and, more particularly, to clutch mechanism.

One of the objects thereof is to provide an efficient, practical clutch mechanism of simple construction and reliable action.

Another object is to provide means in connection with mechanism of the above type adapted automatically to hold the clutch-members in operative relation one to another.

Another object is to provide means in connection with mechanism of the type first described adapted to permit the clutch-members readily to be thrown into or out of operative relation.

Other objects will be in part obvious and in part pointed out hereinafter.

The invention, accordingly, consists in the features of construction, combinations of elements and arrangement of parts which will be exemplified in the mechanism hereinafter described and the scope of the application of which will be indicated in the following claims.

Figure 1:
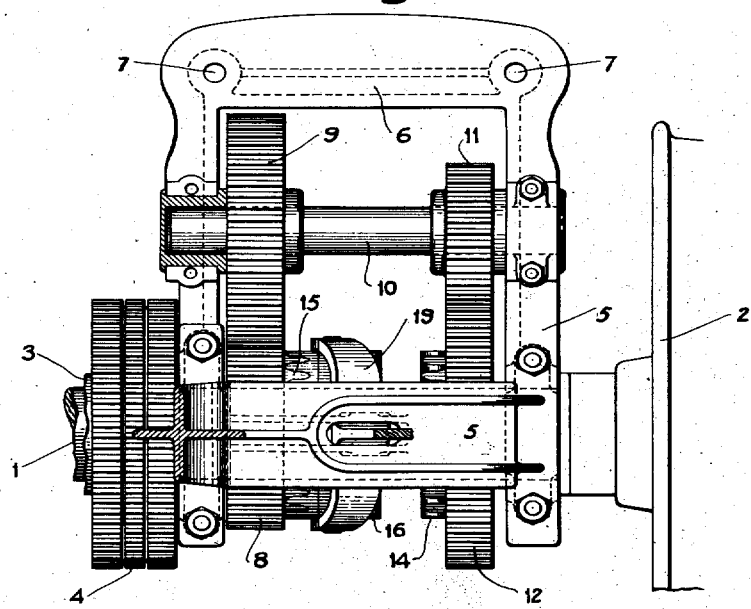
Figure 2:
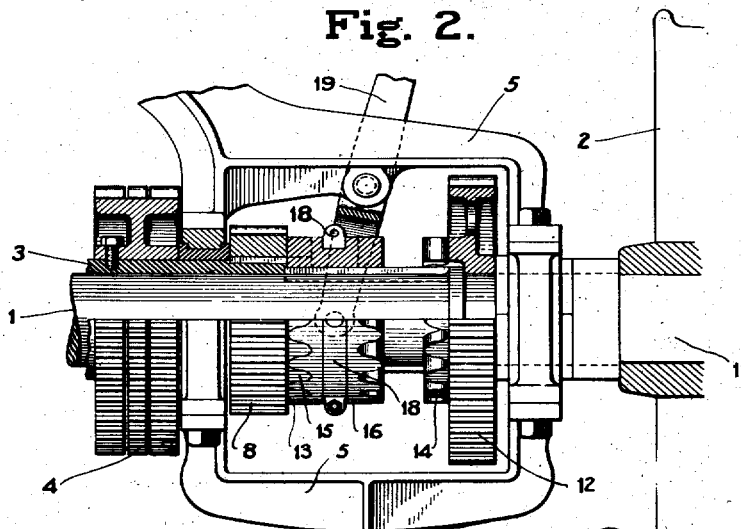
Figure 3:
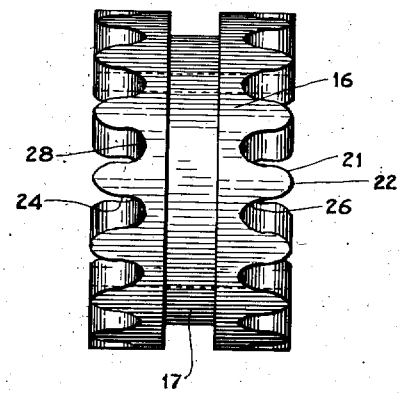
Figure 4:
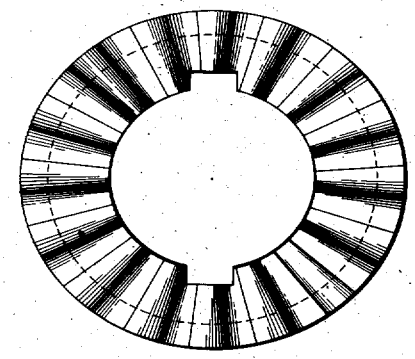

In the accompanying drawings, wherein is illustrated one of the various possible embodiments of my invention, Figure 1 is a plan of the same; Fig. 2 is an elevation, partly in section, of the parts shown in Fig. 1; Fig. 3 is an end view of a clutch-member; Fig. 4 is a side elevation of the same; Fig. 5 is a diagrammatic view showing details of teeth.

Similar reference characters refer to similar parts throughout the several views of the drawings.

Preliminary to a detailed description of this embodiment of my invention and in order to render clearer of understanding certain features thereof, it may here be noted that I have found in connection with mechanism of the nature of that with which this invention deals, that it is highly desirable to provide means for automatically drawing or tending to draw the clutch-members into engagement one with another, whereby no extraneous power is required for holding them in operative relation. I have also found that it is highly advantageous to provide means for automatically assisting in the throwing out of the clutch and thus reduce the power required for this purpose. It may here be noted, moreover, that the latter described means are of peculiar value when used in connection with the holding means first referred to. The above and other advantages are secured in constructions of the nature of that hereinafter described.

Referring now to the accompanying drawings, there is shown in Fig. 2 a shaft or axle 1 having fixed thereon a wheel 2, which, in this illustrative embodiment, represents the wheel of a railway car or other vehicle. Loosely mounted upon shaft 1 is a sleeve 3 having fixed thereon a driving gear 4 which is, in this case, adapted for use with a sprocket-chain and to be driven from any desired source of power. Sleeve 3 and shaft 1 are journaled within a frame 5, having an extension 6, for a purpose hereinafter described, and provided with openings 7 to adapt the same to be mounted upon the truck of the car.

Keyed upon sleeve 3 is a gear 8 intermeshing with a gear 9 fast upon a counter or back gear shaft 10 journaled within the extension 6 of the frame. In like manner fixed upon shaft 10 is a gear 11 meshing with a gear 12 loosely mounted upon the axle or shaft 1. These gears are preferably of proportions substantially of the order shown, thus resulting in the gear 12 being driven at a rate of speed different from and preferably lower than that of the gear 8.

Upon the adjacent, lateral faces of the gears 8 and 12 are formed clutch-members 13 and 14, of which, as the same are identical, one only will be described. Clutch-member 13 comprises a series of teeth 15, preferably sixteen in number and having a shape which will hereinafter be set forth in detail. All engaging surfaces of these teeth are substantially radial to the axis of rotation of the member upon which they are positioned, and the teeth themselves are preferably formed integral with the spur-gears upon which they are mounted.

Keyed upon the shaft 1 is an intermediate double-faced clutch-member 16, the active portions of which are adapted to co-act respectively with the clutch-members 13 and 14. Clutch-member 16 is provided with an annular groove 17, within which is fitted a band 18 having pivotally connected therewith the forked end of an operating lever 19 mounted upon the frame 5 as shown.

The shape of the teeth of the several clutch-members all of which are identical, is best set forth by reference to Fig. 5 of the drawings. Each tooth comprises an outer portion 20 the faces upon the two sides of which are inclined toward the point as shown at 21, the angle of inclination with respect to the central line $x$—$x$ being substantially 45 degrees. The extreme point is flattened or blunted, as shown at 22, to prevent chipping of this part, and the inclined portions are merged into this blunted part by gradual curves as at 23. The inner end of the inclined or converging portions 21 terminates in a curve of lesser radius leading to a portion 24 which is undercut or inclined inwardly toward the root of the tooth. From portion 24, by means of the relatively sharp, curved portion 25, the surfaces develop into portions 26, inclined away from the root of the tooth, and are merged by a short radius curve 27 into a relatively flattened portion 28, forming the base of the space between successive teeth. The entire curve of each part of the tooth is symmetrical with reference to the line $y$—$y$, the inner portion thereof being the reverse of the outer portion so as to provide an even bearing for opposing teeth as shown at 29. The teeth are spaced, moreover, so as to provide a desirable amount of play or back-lash, as at 30, in order to render their action more efficient.

In order to avoid the chance of ambiguity in the meaning of certain terms used throughout this description and the following claims, it may here be noted that they are used with the following significance: By the term "lateral", as descriptive of a portion of a rotatable member, is meant the extreme portion thereof in the direction of its axis of rotation. "Outer" and "inner" are used with reference to portions of teeth as descriptive respectively of those parts which are toward the point or toward the root of the tooth. By the term "undercut" is meant a shape by virtue of which the faces of the tooth are inclined inwardly toward the root, whereas the expression "converging" is used to refer to an opposite disposition of the faces of the tooth.

The operation of the above-described embodiment of my invention, which should be largely obvious from the above description, is substantially as follows: Clutch-member 16, being thrown by lever 19 from any desired source of power, upon first engaging the opposing teeth of clutch-members 13 or 14, tends to be thrown out, but upon being quickly thrust past the relative position in which the inclined surfaces 21 upon the opposing teeth are in engagement, the undercut portions 24 are brought into operative relation and the clutch-members automatically drawn together and held together by their action one upon the other. When it is desired, however, to throw out the clutch or to throw it into engagement with the opposite clutch-member, as for purposes of changing the speed of the driven shaft, it is quickly brought to a position in which the inclined surfaces 21 are brought into engagement, whereupon the teeth are snapped away from one another by reason of the action of these surfaces. The clutch is thus quickly thrown out, reducing the chance of stripping the teeth and aiding the action of the lever 19.

It will thus be seen that I have provided simple and compact clutch mechanism which is well adapted to accomplish the several objects of my invention. The members are readily thrown into engagement, it being necessary merely to bring the engaging teeth into such relation that their undercut faces engage one with another, whereupon they are automatically drawn together and firmly held in engagement. It will be noted, moreover, that the greater the power transmitted, the greater will be the component tending to draw the members together, thus automatically varying this force to meet the conditions required. The members, moreover, are thrown out of engagement with a minimum of effort, it being necessary merely to draw them apart to such an extent as to bring their converging faces into operative relation one with another, whereupon they are quickly and automatically drawn apart. By reason of the substantially identical conformation of the two sides of each of the teeth moreover, the entire mechanism acts with equal efficiency whether the engine be run in a forward or reversed direction and all of the advantageous features thereof are present irrespective of the direction of rotation of the driving member. The entire mechanism is of the simplest and most durable construction and positive and reliable action.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described and all statements of the scope of the invention which, as a matter of language, might be said to fall therebetween.

Having described my invention, what I claim as new and desire to secure by Letters Patent, is:—

1. In a device of the class described, in combination, a pair of clutch-members provided with means adapted on said members being thrown into engagement one with another automatically to tend to draw the same together, said means comprising a plurality of teeth upon each member, the space between contiguous teeth upon a member increasing in a direction toward the roots thereof.

2. In a device of the class described, in combination, a clutch-member, a second clutch-member adapted to be thrown laterally toward the same, and means upon the lateral surface of one of said clutch-members adapted to engage the other thereof and tend to draw said members together, said means comprising a plurality of teeth upon said member, the space between contiguous teeth upon the member decreasing and then increasing in a direction toward the roots thereof.

3. In a device of the class described, in combination, a clutch-member, a second clutch-member adapted to be thrown laterally toward the same, and means upon the lateral surface of each of said clutch-members adapted to engage and positively interlock with the other of said clutch-members and tend to draw said members together, said means comprising a plurality of teeth upon each member, the space between contiguous teeth upon a member decreasing and then increasing in a direction toward the roots thereof and the minimum space being sufficient to permit the passage of the thickest portions of the teeth upon the opposite member.

4. In a device of the class described, in combination, a clutch-member, a second clutch-member adapted to be thrown laterally toward the same, and interlocking, teeth upon said members each of said teeth being undercut upon each side and being adapted to engage another tooth and tend to draw said members together.

5. In a device of the class described, in combination, a clutch-member, a second clutch-member adapted to be thrown laterally toward the same, and means upon the lateral surface of one of said clutch-members adapted upon being placed in a predetermined relation to the other of said clutch-members to tend to draw said members together said last mentioned means being adapted to operate irrespective of the direction of rotation of said members.

6. In a device of the class described, in combination, a clutch-member, a second clutch-member adapted to be thrown laterally toward the same, and teeth upon the adjacent lateral surfaces of said clutch-members adapted upon said members being thrown together to intermesh, the outer faces of said teeth converging and the inner faces thereof being undercut and the opposite sides of each of said teeth being substantially identical.

7. In a device of the class described, in combination, a clutch-member, a second clutch-member adapted to be thrown laterally toward the same, and teeth upon the adjacent lateral surfaces of said clutch-members adapted upon said members being thrown together to intermesh, the outer faces of each tooth converging and both inner faces thereof being undercut.

8. In a device of the class described, in combination, a clutch-member, a second clutch-member adapted to be thrown laterally toward the same, and teeth upon the adjacent lateral surfaces of said clutch-members adapted upon said members being thrown together to intermesh, the faces upon the sides of each of said teeth comprising two curved surfaces the inner of which is substantially the reverse of the outer and the outer of which comprises a portion inclined toward the point of the tooth and a portion inclined inwardly toward the root.

9. In a device of the class described, in combination, a clutch-member, a second clutch-member adapted to be thrown laterally toward the same, and teeth upon the adjacent lateral surfaces of said clutch-members adapted upon said members being thrown together to intermesh, the faces upon the sides of each of said teeth comprising inner and outer portions inclined toward the point of the tooth, and an intermediate portion inclined toward the root thereof.

10. In a device of the class described, in combination, a clutch-member, a second clutch-member adapted to be thrown laterally toward the same, and teeth upon the adjacent lateral surfaces of said clutch-members adapted upon said members being thrown together to intermesh, the faces upon the sides of each of said teeth comprising inner and outer portions inclined toward the point of the tooth and an intermediate portion inclined toward the root thereof, and the outer half of each engaging surface of the tooth being substantially the reverse of the inner half thereof.

11. In a device of the class described, in combination, a clutch-member, a second clutch-member adapted to be thrown laterally toward the same, and teeth upon the lateral surface of one of said clutch-members adapted upon engaging the other member to tend to draw said members together, all the engaging surfaces of said teeth being radial to the axis of rotation of said member and the space between contiguous teeth upon said clutch-member increasing in a direction toward the roots thereof.

12. In a device of the class described, in combination, a clutch - member, a second clutch-member adapted to be thrown laterally toward the same, and interlocking, teeth upon said members each of which is undercut upon both sides adapted upon being thrown into operative relation to tend to draw said members together, all engaging surfaces of said teeth being substantially radial to the axes of rotation of the members upon which they are positioned.

13. In a device of the class described, in combination, a clutch - member, a second clutch-member adapted to be thrown laterally toward the same, and teeth upon the lateral surfaces of said clutch-members provided with inclined faces adapted upon being thrown into a predetermined relation one with another to tend to throw apart said members, all engaging surfaces of said teeth being substantially radial to the axes of rotation of the members upon which they are positioned.

14. In a device of the class described, in combination, a clutch - member, a second clutch-member adapted to be thrown laterally toward the same, and teeth upon the adjacent lateral surfaces of said clutch-members adapted to intermesh upon said members being thrown together, the outer faces of each of said teeth converging and the inner faces thereof being undercut and all engaging surfaces thereof being radial to the axes of rotation of the members upon which they are positioned.

15. In a device of the class described, in combination, a clutch - member, a second clutch-member adapted to be thrown laterally toward the same, and teeth upon the lateral surfaces of said clutch-members adapted upon said members being thrown together to intermesh, the faces upon the sides of each of said teeth comprising two curved surfaces, the inner of which is substantially the reverse of the outer and the outer of which comprises a portion inclined toward the point of the tooth, and an intermediate surface inclined toward the root of the tooth, all engaging surfaces of said teeth being substantially radial to the axes of rotation of the members upon which they are poistioned.

In testimony whereof I affix my signature, in the presence of two witnesses.

WILLIAM R. McKEEN, Jr.

Witnesses:
ARTHUR H. FETTERS,
WILLIAM S. McCUNE.

---

It is hereby certified that in Letters Patent No. 874,419, granted December 24, 1907, upon the application of William R. McKeen, Jr., of Omaha, Nebraska, for an improvement in "Clutch Mechanism," errors appear in the printed specification requiring correction, as follows: In line 48, page 3, and line 7, page 4, the commas after the words "interlocking" should be stricken out; and that the said Letters Patent should be read with these corrections therein that the same may conform to the record of the case in the Patent Office.

Signed and sealed this 21st day of January, A. D., 1908.

[SEAL.]

C. C. BILLINGS,
*Acting Commissioner of Patents.* the space between contiguous teeth upon said clutch-member increasing in a direction toward the roots thereof.

12. In a device of the class described, in combination, a clutch-member, a second clutch-member adapted to be thrown laterally toward the same, and interlocking, teeth upon said members each of which is undercut upon both sides adapted upon being thrown into operative relation to tend to draw said members together, all engaging surfaces of said teeth being substantially radial to the axes of rotation of the members upon which they are positioned.

13. In a device of the class described, in combination, a clutch-member, a second clutch-member adapted to be thrown laterally toward the same, and teeth upon the lateral surfaces of said clutch-members provided with inclined faces adapted upon being thrown into a predetermined relation one with another to tend to throw apart said members, all engaging surfaces of said teeth being substantially radial to the axes of rotation of the members upon which they are positioned.

14. In a device of the class described, in combination, a clutch-member, a second clutch-member adapted to be thrown laterally toward the same, and teeth upon the adjacent lateral surfaces of said clutch-members adapted to intermesh upon said members being thrown together, the outer faces of each of said teeth converging and the inner faces thereof being undercut and all engaging surfaces thereof being radial to the axes of rotation of the members upon which they are positioned.

15. In a device of the class described, in combination, a clutch-member, a second clutch-member adapted to be thrown laterally toward the same, and teeth upon the lateral surfaces of said clutch-members adapted upon said members being thrown together to intermesh, the faces upon the sides of each of said teeth comprising two curved surfaces, the inner of which is substantially the reverse of the outer and the outer of which comprises a portion inclined toward the point of the tooth, and an intermediate surface inclined toward the root of the tooth, all engaging surfaces of said teeth being substantially radial to the axes of rotation of the members upon which they are poistioned.

In testimony whereof I affix my signature, in the presence of two witnesses.

WILLIAM R. McKEEN, Jr.

Witnesses:
ARTHUR H. FETTERS,
WILLIAM S. McCUNE.

---

It is hereby certified that in Letters Patent No. 874,419, granted December 24, 1907, upon the application of William R. McKeen, Jr., of Omaha, Nebraska, for an improvement in "Clutch Mechanism," errors appear in the printed specification requiring correction, as follows: In line 48, page 3, and line 7, page 4, the commas after the words "interlocking" should be stricken out; and that the said Letters Patent should be read with these corrections therein that the same may conform to the record of the case in the Patent Office.

Signed and sealed this 21st day of January, A. D., 1908.

[SEAL.]

C. C. BILLINGS,
*Acting Commissioner of Patents.*

Corrections in Letters Patent No. 874,419.

It is hereby certified that in Letters Patent No. 874,419, granted December 24, 1907, upon the application of William R. McKeen, Jr., of Omaha, Nebraska, for an improvement in "Clutch Mechanism," errors appear in the printed specification requiring correction, as follows: In line 48, page 3, and line 7, page 4, the commas after the words "interlocking" should be stricken out; and that the said Letters Patent should be read with these corrections therein that the same may conform to the record of the case in the Patent Office.

Signed and sealed this 21st day of January, A. D., 1908.

[SEAL.]

C. C. BILLINGS,
*Acting Commissioner of Patents.*